United States Patent
Kakani et al.

(10) Patent No.: US 6,947,750 B2
(45) Date of Patent: Sep. 20, 2005

(54) METHOD AND SYSTEM FOR SERVICE RATE ALLOCATION, TRAFFIC LEARNING PROCESS, AND QOS PROVISIONING MEASUREMENT OF TRAFFIC FLOWS

(75) Inventors: Naveen Kakani, Denton, TX (US); Khiem Le, Coppell, TX (US); Ghassan Naim, Irving, TX (US)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 10/060,378

(22) Filed: Feb. 1, 2002

(65) Prior Publication Data

US 2003/0148768 A1 Aug. 7, 2003

(51) Int. Cl.[7] .............................................. H04Q 7/20
(52) U.S. Cl. ........................... 455/452.2; 455/452.1; 455/450; 455/453; 455/464; 370/395.2; 370/395.21; 370/230; 370/329; 370/468
(58) Field of Search ................................ 455/450, 451, 455/452.1, 452.2, 464; 370/230, 231, 338, 329, 468

(56) References Cited

U.S. PATENT DOCUMENTS

| | | | |
|---|---|---|---|
| 6,574,213 B1 * | 6/2003 | Anandakumar et al. | 370/349 |
| 6,584,108 B1 * | 6/2003 | Chung et al. | 370/401 |
| 6,728,365 B1 * | 4/2004 | Li et al. | 379/329 |
| 6,744,767 B1 * | 6/2004 | Chiu et al. | 370/395.21 |
| 6,765,904 B1 * | 7/2004 | Anandakumar et al. | 370/389 |
| 6,771,661 B1 * | 8/2004 | Chawla et al. | 370/468 |
| 6,775,240 B1 * | 8/2004 | Zhang et al. | 370/251 |

* cited by examiner

*Primary Examiner*—Temica M. Beamer
*Assistant Examiner*—Anthony S. Addy
(74) *Attorney, Agent, or Firm*—Antonelli, Terry, Stout & Kraus, LLP

(57) ABSTRACT

The invention relates to a method and system for providing allocation of resources depending on the characteristics of the flow request. The system allocates resources based upon at least one of the parameters class of service, delay requirement and bandwidth requirement of the flow request. During a call process, the system keeps updating the service rate allocated to meet the QoS requirement of a new flow request, the updated service rate being allocated to a new flow request of the same type. The system learns the traffic pattern and adjusts a current airlink performance to allocate a service rate to flows.

28 Claims, 3 Drawing Sheets

Service Rate Computation Using Table Lookup

METHOD AND SYSTEM FOR SERVICE RATE ALLOCATION, TRAFFIC LEARNING PROCESS, AND QOS PROVISIONING MEASUREMENT OF TRAFFIC FLOWS

BACKGROUND OF THE INVENTION

1. Field of the Invention

The invention generally relates to telecommunications, and in particular to Service Rate allocation algorithms based upon the observed performance, a traffic learning process to improve the estimate of the expected traffic, and a mechanism for QoS provisioning measurement of Traffic Flows in a system.

2. Description of the Prior Art

Given the development of 3 G systems and the applications they are expected to support, the resources allocated to flow requests should be optimized to increase the capacity of the system but at the same time meet the QoS requirements of the flow. However, the airlink performance is of varying nature. The existing algorithms, which allocate some fixed amount of resources, for example resources allocated, can be minimum resources or maximum resources based. This allocation of resources does not consider the traffic nature. Resources are allocated to the flow at the time the flow is requested. If the resources are allocated based on the minimum requirements, QoS violations result (QoS performance of the flow is deteriorated). Maximum allocation leads to under-utilization of system resources.

Different applications have different QoS requirements. Typically the characteristics of a flow are given by the data-rate requirement and delay requirement. When assuming fixed traffic patterns the required service rate to be allocated may be computed based thereon. However, for the next generation applications it is not just sufficient to guarantee the average rate for the applications given the burstiness of the applications which are expected to be supported and the airlink performance as well.

Further, the requirements of the flow requests for complying with the specific requirements of the flow are not easy to estimate. Given the varied type of applications which users can run, it is not possible for the application (e.g. RAB parameters) to include all the possible aspects of the traffic. For example considering Variable Bit Rate (VBR) traffic requests, it is not possible to quantify the characteristics of the traffic. If the application is quantified based upon delay/jitter requirements or traffic burstiness, it is not possible to extract these parameters for different applications.

User flow requests usually have a QoS profile. The QoS profile information can be used to know the upper and the lower bound of the flow requests requirements. However, user flow requests do not know the parameters of the flow request. Instead of putting the burden on the user flow request, it is the system which tries to determine the service parameters that are required for this new flow request and based upon that, the resources allocated to this flow can be adjusted to meet the QoS requirements of the flows. Apart from the traffic characteristics of the user flow, the system also estimates the required resources for the current airlink performance. It is not possible for the user flow to know the radio conditions but if the system can maintain the history of the flow request and the airlink performance, then it is possible for the system to predict the requirements of the new flow request.

Given the bursty nature of the traffic and the varying airlink performance, it is not sufficient to just allocate resources based on the average data-rate and average delay requirements to meet the promised QoS. To meet the QoS and utilize resources efficiently, it is preferable to dynamically adjust the allocated resources to react to the traffic burstiness and/or air link performance. In order to do that, efficient mechanisms to measure the actual QoS would be needed.

SUMMARY OF THE INVENTION

The present invention is a method, system and device.

To obtain an optimal trade-off between the two constraints of avoiding QoS violations as well as under-utilization of system resources, embodiments of the invention provide allocation of resources as per the characteristics of the flow request.

The system allocates resources based upon the class of service, delay requirement and the bandwidth requirement of the flow request. During the call process, the system keeps updating the service rate which it should have allocated to meet the QoS requirement of the new flow request and the updated service rate is what is allocated to a new flow request of the same type. In this manner the system learns the traffic pattern and also adjusts depending on the current airlink performance to allocate the service rate to the flows.

Embodiments of the invention overcome the requirements of the flow requests so as to be able to comply with the specific requirements of the flow which are not easy to estimate.

Embodiments of the invention provide a learning process by which the system adjusts the required service rate of the applications and allocates the computed service rate for new flow requests. This aspect of the invention proposes a learning process by which, based upon the current allocation, the system learns how which resources it should have allocated to be able to meet the promised QoS requirement of the flow request and also to increase the system capacity (e.g. the number of flow requests the system can support simultaneously).

The proposed service rate computation algorithm may preferably be applied to all the 'C' classes of traffic in a system similar to UMTS classes.

The system preferably allocates resources based upon at least one of, most preferable all of, the parameters "class of service", "delay requirement", "bandwidth requirement" of the flow request. During the call process the system keeps updating the service rate which it should have allocated to meet the QoS requirement of the new flow request and the updated service rate is what is allocated to a new flow request of the same type. In this manner the system learns the traffic pattern and also adjusts as per the current airlink performance to allocate the service rate to the flows.

The gathering of the information is preferably not used to modify the allocation of flows already admitted but used to refine the allocation for future flows. The method and system of the invention address the characteristics of the traffic. Hence, the service rate need not be updated everytime. However, every time the traffic characteristics are noted to cater the needs of new flows.

Embodiments of the invention provide a useful method for resource allocation. According to one of the preferred embodiments, the system monitors how the QoS requirements are met and based on that allocates the resources to the future flows of certain types.

More generally, embodiments of the invention use the performance of the current calls to predict the requirements of future flow requests of the same traffic class. The mechanism used to predict the flow requirements takes account of the service rate adaptation algorithm if any, and suggestions as to how to change the service rate.

Embodiments of the invention have an adaptive nature in the sense the algorithm adapts to each flow request and airlink performance by constantly maintaining certain parameters associated with each traffic request class. There is no need to consider only the average performance and provide the flow requests with the average performance. Providing average performance is not same as providing the required QoS.

Given the various types of applications which users can run, it is not possible for the application to include all the possible aspects (e.g. RAB parameters) of the traffic. For example, in a Variable Bit Rate (VBR) flow request, it is not possible to quantify the characteristics of the traffic. At least some embodiments of the invention use the performance of earlier calls to predict the requirements of future flow requests of the same traffic class. The algorithm adapts to each flow request and airlink performance by constantly maintaining certain parameters associated with each traffic request class.

At least some embodiments of the invention are applicable to packet data applications (including real-time such as conversational voice or video over IP, streaming, etc., and non-real-time) in cellular systems. Specifically, the field is Quality of Service (QoS) for bursty applications over a cellular link with possibly time varying performance.

At least some embodiments of the invention overcome the problem of dynamically estimating the QoS performance, to take account of the burstiness of the traffic and the airlink performance as well.

This solution provides a better estimate of the actual QoS seen by the users and it measures the QoS in a manner which can be easily used to update the service commitments to the flow to improve the provided QoS.

Advantages include that the measure (result of measurement) preferably provides a direct estimate of the percentage of time the QoS is met. Thus if the objective is for the QoS to be met at least X say =99% of the time, the measure can be directly compared with X, and resources increased or decreased to closely track X. Another advantage is the relative simplicity of the scheme.

At least some of embodiments of the invention define a mechanism to measure the QoS (e.g. queue lengths, drop rate) actually experienced by a given data application flow. The measuring is based on an evaluation of the number or proportion of packets for which the QoS was met or not met in the past time periods. The measure can be directly compared against QoS performance objectives such as "the QoS must be met at least X % of the time". It can be used to adapt or adjust system behavior, e.g. reallocate resources for existing flows, and/or refine the resource allocation decision for new flows, Thus one can meet QoS objectives, and yet utilize resources efficiently (no over-allocation or under-allocation). In this method the queue lengths are monitored and compared to a threshold to determine if the QoS is ok. Also the drop rate of flow is updated to determine if the flow has met the required QoS.

The invention according to this aspect focuses on measuring delay and amount or percentage of packets which are below the threshold. In GPRS/3 G profile the delay is defined from MS to GGSN, not for each network element and for different networks. In a case where it should be difficult for network elements to decide what portion of the overall delay can be used so that the packet meets the required end-to-end delay, an embodiment of the invention may measure how big is the portion of real-time packets which do not meet QoS in bandwidth sense. This may be done by monitoring the amount/size of the packets of the connection and comparing that value(s) to guaranteed bitrate values of QoS profile.

DETAILED DESCRIPTION OF PREFERRED EMBODIMENTS OF THE INVENTION

Figure 1:
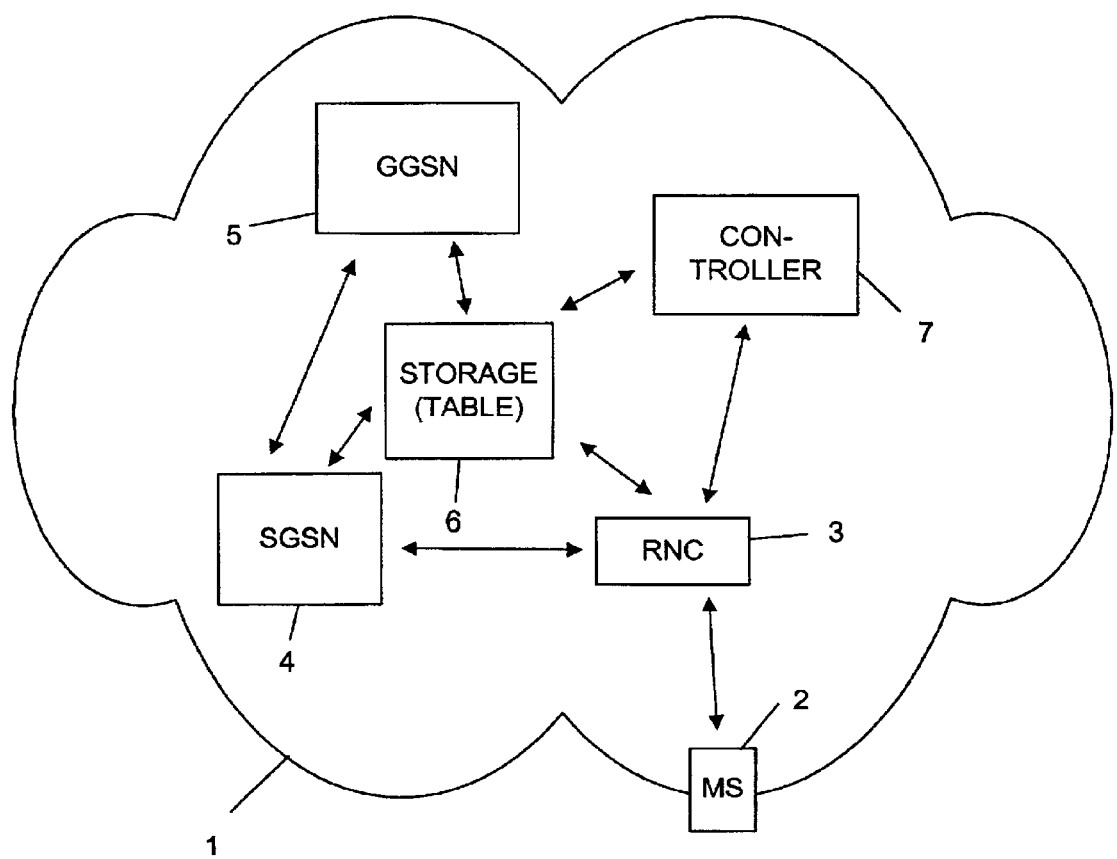
FIG. 1 illustrates a basic structure flow of an embodiment of a communication system in accordance with the invention.

FIG. 1 shows a basic structure of an embodiment of a system in accordance with the invention. The system is implemented in or as a network 1, or forms a part thereof. The network 1 comprises at least one, or a plurality of, user equipments 2 which, in this embodiment, are implemented as mobile stations MS. The user equipments may also be any other type of equipments such as stationary terminals. Although only one user equipment 2 is shown, usually several user equipments are attached to the network 1 and represent connection originating or terminating equipments.

In case of connection, or connection set-up, with another equipment forming part of network 1 or of another network, a radio connection to user equipment 2 is provided and handled by a radio access network (RAN). The RAN comprises, in this embodiment, a radio network controller (RNC) 3 which is part of, or represents, the radio access network for radio connection to user equipment 2. Usually, several radio access networks and controllers 3 may be provided in the network 1 for radio coverage of the different areas of the network 1. The RNC 3 may be selectively connected to different serving nodes which, in this embodiment, are implemented as SGSN 4.

The network may comprise additional or alternative serving nodes such as mobile switching centers (MSCs) which normally will be combined with visitor location registers (VLRs). The serving node 4 may have established a connection, if necessary, to a gateway node 5, e.g. a GGSN, for providing a connection to other networks.

Figure 3:
FIG. 3 shows a table usable in an embodiment of a system and method in accordance with the invention.

The communication system includes at least one, or more, storages 6 which store at least one table such as shown in FIG. 3.

In addition, a controller, e.g. server, 7 is provided which may form part of network 1 or may be a network-external component. The controller 7 can control the storage 6 for reading, writing, updating the storage contents. The storage 6 can be accessed by RNC 3, and/or by other network components such as serving node 4 and/or gateway node 5. The communication possibilities between the elements are shown in FIG. 1 as double-headed arrows.

FIG. 3 illustrates an example of a table 11 stored in storage 6. The table 11 is usable for Service Rate Computation Using Table Lookup. This mechanism relies on the fact that there will be only constant number of delay requirements in a traffic class and fixed number of arrival rates.

The table 11 as shown in FIG. 3 will be constructed and stored for each traffic class which the system will be supporting. The columns of the table 11 shown in FIG. 3 represent: Class, Delay, Arrival Rate, and Service Rate. The class is represented as C1, with several possible delays D1, D2, and several possible arrival rates $^{D1}\lambda_1$ $^{D1}\lambda_2$ etc, and corresponding service rates $^{D1}\mu_1$, $^{D1}\lambda_2$, etc, as shown in the table 11.

The mechanism which is used to update this table 11 is as follows. A flow request is characterized by at least two of, i.e. a tuple of parameters (e.g. Class of traffic, delay requirement, mean arrival rate). A tuple means a fixed size collection of elements. Pairs, triples, quadruples etc. are tuples.

The attributes in the table are for illustration but not restrictive. One of the basic ideas of at least some of embodiments of the invention is to categorize the flows into groups which have the same stochastic properties, and for each group, assign a service rate to meet the QoS requirements.

Figure 2:
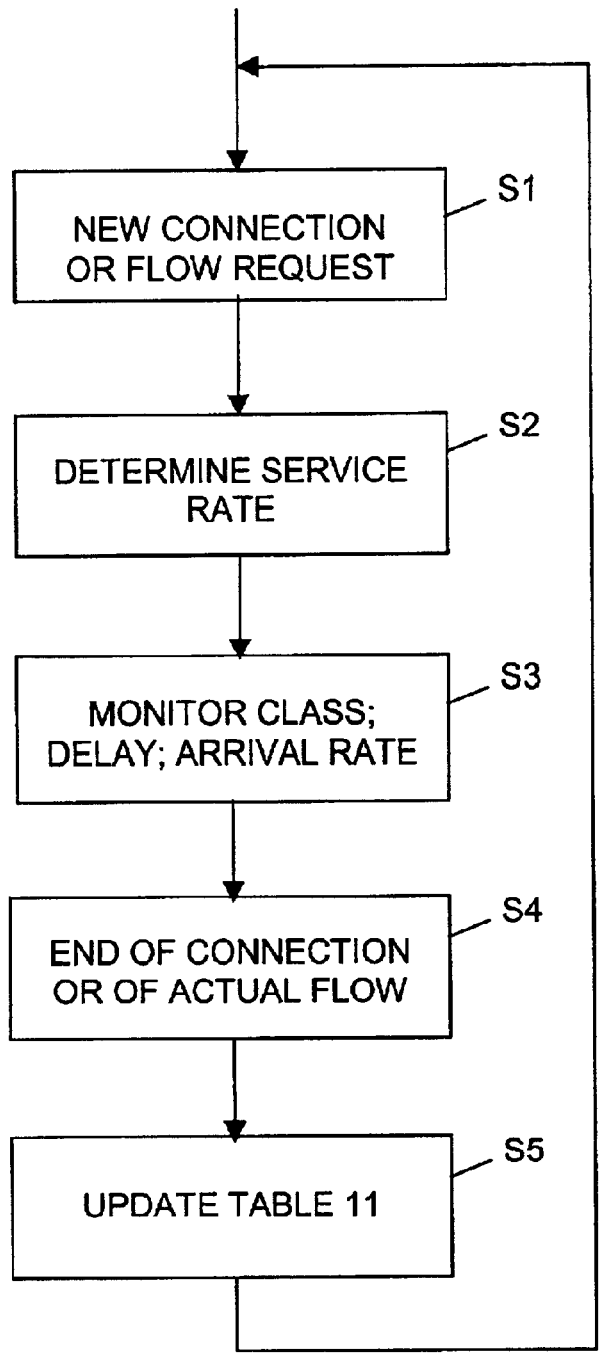
FIG. 2 shows a basic structure of an embodiment of a method in accordance with the invention.

FIG. 2 shows an embodiment of a method in accordance with the invention.

In a step S1, a new connection or flow request is established e.g. between SGSN 4, RNC 3 and MS 2. In step S2, the RNC 3 or another entity such as controller 7 determines the service rate to be allocated to this connection or flow request. The determination of the service rate to be allocated is preferably performed checking the actual contents of the table 11, in addition to taking account of the type of the connection or flow to be established (class, Real-time, non real-time, data connection, speech connection, etc.). In the step S3, RNC 3 or another entity monitors parameters of the actual connection or flow, e.g class; delay; arrival rate of packets transmitted during the connection or flow.

When, at step S4, the connection or flow is terminated (end of connection), the table 11 is updated (Step S5). The process then returns to the first step S1 when a new connection or flow is to be established. Again, in step S2, the RNC 3 or another entity such as controller 7 determines the service rate to be allocated to the new connection or flow, the determination of the service rate to be allocated being performed checking the actual contents of the table 11 updated in the step S5. The updating step S5 can also be performed during the ongoing connection or flow, i.e. before step S4, on a repetitive or intermittent basis.

If the flow request happens to be the first flow request in the system with the flow characteristics (e.g. as mentioned above) the service rate allocated to the flow request is:

$\mu_{new} = \alpha_{class}$*(mean arrival rate of new flow request).

$\mu_{new}$ represents the data rate, $\alpha_{class}$ the parameter associated with each traffic class (this parameter represents the burstiness and the airlink performance).

During the flow duration, the service rate column corresponding to the flow tuple is constantly updated, at the end of the observation period, by an amount α. This is computed by as part of the algorithm that is used to adjust the service rate to meet the flows QoS requirement. Note that this is done irrespective of the fact whether the service rate is adaptable during the call or not. If there is a new flow request with the same characteristics then the service rate corresponding to these flow characteristics is looked up from the table and assigned to the flow request. When there are multiple flow instances with the same tuple, the service rate to be updated to the table is the average of the service rate of the flow requests.

In accordance with a preferred embodiment of the invention, the system maintains a table, e.g. such as shown in FIG. 1, for each traffic class, delay requirement and data rate requirement. The service rate to be allocated is updated at the end of the observation period to correct the error in the earlier estimate. A mechanism is provided to update the required service rate for the new call based upon the previous estimates and the obtained performance.

A traffic class is defined to be a subdivision of UMTS classes based upon the relationship between the standard deviation in the arrival rate and the mean arrival of data to the system. The concept of traffic learning process is presented in the following.

Let there be a call request with mean arrival rate $\lambda_{mean}$ and the burstiness in the traffic is estimated as $\alpha_{class}$. The expected delay requirement expressed in terms of the queue length of this flow request is given by $\delta_{app}*\lambda_{mean}$. The service rate allocated to the system is based upon the delay requirement of the flow and the mean call arrival rate scaled by the burstiness factor which is given by $\alpha_{class}*\lambda_{mean}$.

However when the system is learning the traffic pattern, it is not possible to come up with the correct value of $\alpha_{class}$ immediately. The approach used to learn the traffic pattern is as follows.

Consider an observation period (say N frames), at the end of the observation period count the number of frames where there were QoS violations (for example the queue size is more than the delay requirement (call this as delay violation)). If the ratio of the number of frames where there were delay violations to the total number of frames during the observation period is more than the tolerable QoS violation, then the arrival rate assumed to compute the service rate is a lower estimate otherwise the arrival rate assumed is an over-estimate. Based upon these observations, the arrival rate of flow requests of this class of traffic requests is updated. With each call of a particular class of traffic request a parameter is associated with it to capture the trend of the traffic request. For example the parameter associated with call "i" of a traffic class "class" is denoted as $\alpha'_{class}$. When a flow is initiated this parameter is assigned to the flow.

Note that once a particular service rate is assigned to a particular traffic request, it might not be possible to change the resources allocated to that flow. Under this scenario an estimate of traffic request is obtained by modifying the delay requirement based upon the arrival rate and the assigned service rate. To learn the traffic pattern consider the following possible two cases:

Packets remain in queue until they are served,

Packets are dropped from the queue if there is a delay violation of the packet.

The proposed algorithm does not control whether packets remain in the queue or are dropped from the queue.

"No packets dropped": In this case at the end of the observation period, the ratio of the number of frames during which QoS violations occurred to the total number of frames during the observation period denoted by $X_i^{Class}$ either more or less than the tolerable QoS violations say ("$X_{class}$") and accordingly the parameter $\alpha_i^{class}$ is updated by $$\Delta_i^{class} = \left( \frac{X_i^{class} - X_{class}}{X_{class}} \right) * \alpha_i^{class}.$$

Note that by making this adjustment there is a change in the arrival rate of the call that is going on but there is no change in the tolerable queue length and the service rate provided. Preferably, the tolerable delay (in terms of queue length) is updated, as the service rate provided cannot really be controlled.

The tolerable delay was set to $\delta_i^{class}*_{mean}\lambda_i$ where $\delta_i^{class}$ is the delay of the flow request and $_{mean}\lambda_i^{class}$ is the mean datarate requirement of the flow request. The new tolerable delay would be $_{tot}\delta_i^{class}=\alpha^i{}_{class}*\delta_i^{class}*_{mean}\lambda_i^{class}$. By proceeding in this manner, the arrival pattern is estimated with a fixed service rate assumption. If there is an opportunity to change the service rate of the system then instead of changing the value of delay tolerable, the current service rate is scaled by the factor $$\left(1+\left(\frac{\Delta_i^{class}}{\alpha_i^{class}}\right)\right)$$

to obtain the required service rate. This is under the assumption that the current performance of the flow is only based upon the service rate allocated and not on the radio conditions.

If radio conditions were to be included as well (the parameter $\alpha_i^{class}$ has the effect due to the radio conditions as well) then the decision whether the service rate is to be updated or not depends upon the radio measurements as well.

"Packets are Dropped": For this case a parameter is maintained which is called the drop rate for each call denoted by $\lambda_{class}^i$ (for ith call of traffic class "class"). This parameter is updated at the end of a observation period. During the observation period the number of dropped packets are registered or counted. At the end of the observation period the average drop rate for the observation period is computed and let it be denoted by $^{sub}\lambda_i^{class}$. The drop rate computed during the observation period is used to update the drop rate of the flow and it is used to determine whether or not the flow has the required QoS.

The ratio $X_{class}^i={}^{sub}\lambda_i^{class}/(\alpha_i^{class}{}_{mean}\lambda_i^{class})$ is either more or less than a factor "$X_{class}$" and accordingly the parameter $\alpha_{class}^i$ is updated by $$\Delta_i^{class} = \left(\frac{X_{class}^i - X_{class}}{X_{class}}\right)*\alpha_i^{class}.$$

At the end of each observation period the drop rate of each flow is updated with the drop rate computed during the last observation period as:

$$\lambda_i^{class}=a^{sub}\lambda_i^{class}+(1-a)\lambda_i^{class}$$

The factor a (0<a<1) is a simulation parameter. The objective is to capture the drop rate due to the burstiness and airlink performance rather than the average drop rate.

This aspect of the invention can be used to monitor the queue lengths at the network side (say BTS) where the scheduling of the packets is done. Now at the end of each frame the queue is updated with the new packets that arrived during the last frame and the packets served during the last period. From these parameters the QoS criteria promised at the time of call setup (Say X % of the time you are allowed to have QoS violations and so on) are used to measure the performance of the flow and update the system accordingly.

In accordance with an embodiment, the queue length is compared with a threshold to determine if the QoS is okay or not and a mechanism is provided to compute the drop rate and compare it with certain QoS requirement.

Note that the service rate of the system cannot be improved and the admission controller algorithm does not control the drop rate of packets. In the above mechanism, the updated value of the arrival rate corresponding to each flow is used. Thus the current system setup is used to learn the traffic pattern. If a change in the service rate is allowed then the constraints that are applicable to the earlier case also apply here as well.

In the following, the arrival rate of traffic in flows of the traffic class is discussed. Irrespective of the cases explained above and irrespective of the fact whether the service rate is updated or not the scaling factor for the arrival rates of call requests of the class is updated at the end of each observation period.

Let there be $N_{class}$ number of flow requests of a traffic class "class". As explained earlier the parameter $\alpha_i^{class}$ associated with flow "i" of traffic class "class" is updated by an amount of $\Delta_i^{class}$ at the end of the observation period. Then the updated parameter is $$\alpha_{class} = \alpha_{class} + \frac{\sum_{j=1}^{N_{class}} \Delta_j^{class}}{N_{class}}.$$

For a new flow request the current value of $\alpha_{class}$ is used to estimate the arrival rate of traffic (to capture the burstiness and the current radio conditions in traffic).

One of preferred modes of implementation of the invention is as follows.

At the time of flow establishment the system tries to learn about the expected traffic behavior if the new flow is admitted into the system. To do so, the system maintains certain parameters which are obtained at the end of each observation period if the flows are having the required QoS or not. If the flows do not have the required QoS, it is decided what is the amount of change in the estimates that needs to be done to determine the requirements of the new flow. Typically the computation of QoS being satisfied or not is done at the point where user flow queues/flow parameters are maintained and the decision of the amount of change in the expected traffic is done at a higher layer which has the global view of all the flows being supported in that basestation (BTS). The algorithm presented here although shown with an example implementation to a wireless system can be applied to wireline systems as well.

In accordance with a preferred embodiment, the system or method has a dynamic traffic estimator based on which the service rate is allocated to the new flow requests. The invention may be used in a BSS, e.g. be incorporated in BSS which is IP-RAN.

Each flow in the system has certain QoS requirement for example data rate, delay requirement etc.

The application can make out the delay between the transmission of the packet and the time it receives the packet. From the system point of view it is very difficult to know the delay of a packet without actually looking into the packet. Other mechanisms to estimate the delay are:

Queue Length (in terms of the number of bytes in the queue): Drawbacks of this mechanism are that if the size of individual packets is small then there is a higher number of packets queued and if the size of the packet is large then there are fewer packets queued (example: Packets of video application). There is no uniform standard to estimate the delay (same amount of data can be packed in packets of different sizes).

Number of Packets: Drawbacks of this mechanism are that packets of different applications need not be of the same size. If the system sets the delay criteria with respect to the number of packets then the delay requirement is not really met.

To overcome this problem the queue length is calculated with respect to a normalized packet size S (S could be the length of the smallest size packet). If a packet has a length equal to n times S, then that packet is modeled as n packets of standard size S. In what follows, the standard size packets are referred to as modeled packets. Let 'Y' be the maximum number of modeled packets that can be in the queue without violating the QoS delay requirement.

Given a service rate of arrival, compute the expected service rate such that the queue length is not more than S*Y. When the application specifies a delay requirement the expected length of the queue is given by $$S*Y = \text{delay} * \text{mean arrival rate} = \delta_{app} * \lambda_{mean}$$

When an average arrival rate of data is given, and when the delay tolerated is say $\delta_{app}$ then the number of packets in the queue is no more than $\delta_{app} * \lambda_{mean}$. Note that the traffic request is bursty in nature, hence, the arrival rate is not exactly $\lambda_{mean}$ at each frame. However this particular scenario is handled by the fact that the resources allocated to the call are not based on the mean arrival rate. Instead the bursty nature of the call flow requests of this class of traffic requests will be considered in updating. A QoS estimation process is presented for the following two cases:

Packets remain in the queue until they are served,

Packets are dropped from the queue if there are delay violations.

Packets remaining in the queue or being dropped from the queue are controlled by the QoS controller or there is an overflow of packets in the queue.

Packets are not dropped: In this case the queue length is used to determine whether there are any delay violations in the flow request or not. At the end of the observation period (certain number of frames), the ratio of the number of frames during which QoS violations occur, to the total number of frames during the observation period denoted by $X_i^{class}$ (parameter of ith call of traffic class "class") is either more or less than a factor "$X_{class}$" parameter associated with traffic class "class", and accordingly the adjustment of QoS is done.

If packets are dropped from the queue when there are delay violations, this case can be handled as discussed above.

Although the invention has been described above with reference to specific embodiments, the scope of the invention also covers any alterations, additions, modifications, and omissions of the disclosed features.

Abbreviations:

$\delta_{app}$: Delay requirement of the new flow request, $\mu app$: Data rate requested by the application, $B_{app}$: Bit Error Rate requirement of the new flow request, $\lambda_{mean}$: Mean data rate of the new flow request, S: Standard size of the packet assumed to measure the queue length, $\alpha_{class}$: Parameter associated with each traffic class, it captures the burstiness and the airlink performance, X: This is QoS parameter associated with each flow request (can be with each class as well) and tries to ensure that the probability of QoS violation is no more than X %, $\alpha^i_{class}$: Parameter associated with call "i" of traffic class "class" to capture the traffic pattern and the airlink performance, $X_i^{class}$: QoS performance of call "i" of traffic class "class" during the last observation period, $\Delta_i^{class}$: Amount of correction required in $\alpha^i_{class}$ at the end of the observation period, $\delta_i^{class}$: Delay requirement of call "i" of traffic class "class", $_{mean}\lambda_i^{class}$: Mean arrival rate of call "i" of traffic class "class", $_{tol}\delta_i^{class}$: Tolerable delay of call "i" of traffic class "class" in terms of the size of the queue, $\lambda^i_{class}$: Statistical packet drop rate of call "i" of traffic class "class", $^{sub}\lambda_i^{class}$: Packet drop rate of call "i" of traffic class "class" during an observation period, $\alpha_{class}$: Parameter associated with traffic class "class" to capture the traffic pattern and the airlink performance, a: Weighting factor used to compute the average rates from the current average rate and the rate observed, $^{sub}\lambda_i^{class}$: Number of packets arrived during the last frame period of flow "i" of traffic class "class".

What is claimed is:

1. A method for determining allocation of resources in a communication system comprising at least two entities, the resources being allocated for transmitting, receiving, or forwarding information, the information being transmitted as flows, wherein the system allocates resources based upon at least one parameter comprising, class of service, delay requirement, arrival rate requirement and service rate requirement of a current flow request which parameters are stored, and wherein, during a call or connection between the at least two entities, the system monitors at least one of the parameters for updating the service rate allocated to meet a Quality of Service QoS requirement of the current flow request in accordance with a result of the monitoring, the updated service rate being allocated to a new flow request of a same type, and wherein a learning process is provided for adjusting a required service rate of applications and allocating a computed service rate for new flow requests, wherein, based upon a current allocation, the system learns which resources should have been allocated to be able to meet a promised QoS requirement of the current flow request.

2. A method according to claim 1, wherein the system learns the traffic pattern and adjusts a current airlink performance to allocate a service rate to flows.

3. A method according to claim 1, wherein a service rate computation algorithm is applied to all classes of traffic in a system.

4. A method according to claim 1, wherein information gained by monitoring the parameters is used to refine the allocation of future flows but is not used to modify the allocation of flows already admitted.

5. A method according to claim 1, comprising the step of monitoring how the QoS requirement is met and based on thereon allocating resources to future flows of different types.

6. A method according to claim 5, wherein a service rate adaptation algorithm is used to predict the flow requirements.

7. A method according to claim 1, wherein the system uses an algorithm which adapts to each flow request and airlink performance by constantly monitoring parameters associated with each traffic request class.

8. A method according to claim 1, applied to packet data applications including real-time and/or non-real-time applications in a cellular system, for QoS for bursty applications over a cellular link.

9. A method according to claim 1, comprising the step of measuring QoS actually experienced by a given data application flow, the measuring being based on an evaluation of a number or proportion of packets for which the QoS was met or not met in past time periods.

10. A method according to claim 9, wherein measured values are directly compared against a QoS performance objective.

11. A method according to claim 10, wherein the QoS performance objective is that the QoS performance must be met at least a specified percentage of the time.

12. A method according to claim 11, wherein a value measured by an entity of the system provides a direct estimate of a percentage of time the QoS is met, the measured value being directly compared with the specified percentage, and resources are increased or decreased to track the specified percentage.

13. A method according to claim 1, wherein queue lengths are monitored and compared to a threshold to determine if a provided QoS is within an acceptable limit.

14. A method according to claim 13, wherein delay and an amount or percentage of packets which are below the threshold are is measured.

15. A system for determining allocation of resources in a communication system comprising at least two entities, the system comprising an allocation system which the allocates resources for transmitting, receiving, or forwarding information, the information being transmitted as flows, wherein the system allocates resources based upon at least one parameter comprising class of service, delay requirement, arrival rate requirement and service rate requirement of a current flow request which parameters are stored, comprising a monitoring system, which during a call or connection between the at least two entities, monitors at least one of the parameters for updating service rate allocated to meet a Quality of Service QoS requirement of the current flow request in accordance with a result of the monitoring system, the allocation system allocating the updated service rate to a new flow request of the same type, and wherein a learning system is provided for adjusting a required service rate of applications and allocating a computed service rate for new flow requests, wherein, based upon the current allocation, the learning system learns how resources of the system should have allocated to be able to meet a promised QoS requirement of the flow request.

16. A system according to claim 15, wherein the system learns the traffic pattern and adjusts a current airlink performance to allocate a service rate to flows.

17. A system according to claim 15, wherein the allocation system includes a service rate computation algorithm to be applied to all classes of traffic in a system.

18. A system according to claim 15, wherein the monitoring system refines resource allocation for future flows but does not modify allocation of flows already admitted.

19. A system according to claim 15, wherein the monitoring system monitors how the QoS requirements are met and based thereon allocates resources to future flows of different types by the allocation system.

20. A system according to claim 19, wherein the allocation system includes a service rate adaptation algorithm for predicting the flow requirements.

21. A system according to claim 15, wherein the system includes an algorithm which adapts to each flow request and airlink performance by constantly monitoring parameters associated with each traffic request class.

22. A system according to claim 15, applied to at least one packet data applications including real-time and non-real-time applications in a cellular system, for bursty applications over a cellular link.

23. A system according to claim 15, wherein the QoS of the system is experienced by a given data application flow and measuring of QoS is performed based on an evaluation of a number or proportion of packets for which the QoS was met or not met in past time periods.

24. A system according to claim 23, comprising a comparison device which compares measured values against a QoS performance objective.

25. A system according to claim 24, wherein the QoS performance objective is that QoS must be met at least a specified percentage of the time.

26. A system according to claim 25, wherein a value measured by an entity of the system provides a direct estimate of a percentage of time the QoS is met, the measured value being directly compared with the specified percentage, and resources are increased or decreased to track the specified percentage.

27. A system according to claim 15, wherein queue lengths are monitored and compared to a threshold to determine if a provided Qos is within an acceptable limit.

28. A system according to claim 2, wherein delay and an amount or percentage of packets which are below the threshold are measured.

* * * * *